(12) United States Patent
Sato

(10) Patent No.: US 7,894,152 B2
(45) Date of Patent: Feb. 22, 2011

(54) PERPENDICULAR RECORDING DISCRETE TRACK MEDIUM AND SERVO PATTERN MAGNETIZATION METHOD FOR SAME

(75) Inventor: Kiminori Sato, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 193 days.

(21) Appl. No.: 11/972,083

(22) Filed: Jan. 10, 2008

(65) Prior Publication Data

US 2008/0174913 A1 Jul. 24, 2008

(30) Foreign Application Priority Data

Jan. 10, 2007 (JP) .............................. 2007-002453

(51) Int. Cl.
G11B 5/09 (2006.01)
(52) U.S. Cl. ....................................................... 360/48
(58) Field of Classification Search ............. 360/77.08, 360/48, 51, 135; 428/848.5, 828.1, 826
See application file for complete search history.

(56) References Cited

U.S. PATENT DOCUMENTS

| | | | | |
|---|---|---|---|---|
| 7,095,581 | B2 * | 8/2006 | Tagami | 360/77.08 |
| 7,136,252 | B2 * | 11/2006 | Tagami | 360/77.08 |
| 7,209,313 | B2 * | 4/2007 | Tagami | 360/77.08 |
| 7,236,325 | B2 * | 6/2007 | Albrecht et al. | 360/77.08 |
| 7,324,295 | B2 * | 1/2008 | Teguri et al. | 360/51 |
| 7,403,353 | B2 * | 7/2008 | Tagami et al. | 360/77.08 |
| 7,443,622 | B2 * | 10/2008 | Kaizu et al. | 360/15 |
| 7,510,788 | B2 * | 3/2009 | Kawada | 428/828.1 |
| 7,532,423 | B2 * | 5/2009 | Kaizu et al. | 360/48 |
| 7,554,768 | B2 * | 6/2009 | Soeno et al. | 360/135 |
| 2005/0191526 | A1 * | 9/2005 | Fujita et al. | 428/848.5 |
| 2006/0203365 | A1 | 9/2006 | Nakao | |
| 2006/0203368 | A1 * | 9/2006 | Kaizu et al. | 360/48 |
| 2006/0269791 | A1 * | 11/2006 | Okawa et al. | 428/826 |
| 2006/0275692 | A1 * | 12/2006 | Okawa et al. | 430/269 |

(Continued)

FOREIGN PATENT DOCUMENTS

JP 3-181016 A 8/1991

(Continued)

OTHER PUBLICATIONS

Notification of Reasons for Refusal issued in corresponding Japanese Patent Application No. 2007-002453 dated Sep. 14, 2010. Partial English translation provided.

Primary Examiner—Fred Tzeng
(74) Attorney, Agent, or Firm—Rossi, Kimms & McDowell LLP

(57) ABSTRACT

A servo pattern magnetization method is provided, having full-amplitude servo signals, to eliminate the need for intensity modification and waveform shaping during servo signal reading, and to improve the precision of head positioning and enable an increase in track recording density. A servo pattern magnetization method for a perpendicular recording discrete track medium, having a plurality of recording areas and a plurality of servo areas separating the plurality of recording areas, has a process of recording magnetization perpendicular to the substrate and in opposite directions in each of the magnetic recording layers of the plurality of servo blocks, by means of the leakage magnetic field from the soft magnetic layers separated from other servo blocks when a magnetic field is applied.

5 Claims, 6 Drawing Sheets

U.S. PATENT DOCUMENTS

| | | | |
|---|---|---|---|
| 2006/0280975 A1* | 12/2006 | Albrecht et al. | 428/848.5 |
| 2008/0158718 A1* | 7/2008 | Kobayashi et al. | 360/77.08 |
| 2008/0204934 A1* | 8/2008 | Tsuchiya et al. | 360/135 |
| 2009/0097160 A1* | 4/2009 | Yamamoto | 360/135 |

FOREIGN PATENT DOCUMENTS

| | | |
|---|---|---|
| JP | 4-310621 A | 11/1992 |
| JP | 2000-222846 A | 8/2000 |
| JP | 2003-16623 A | 1/2003 |
| JP | 2004-110896 A | 4/2004 |
| JP | 2006-228347 A | 8/2006 |

\* cited by examiner

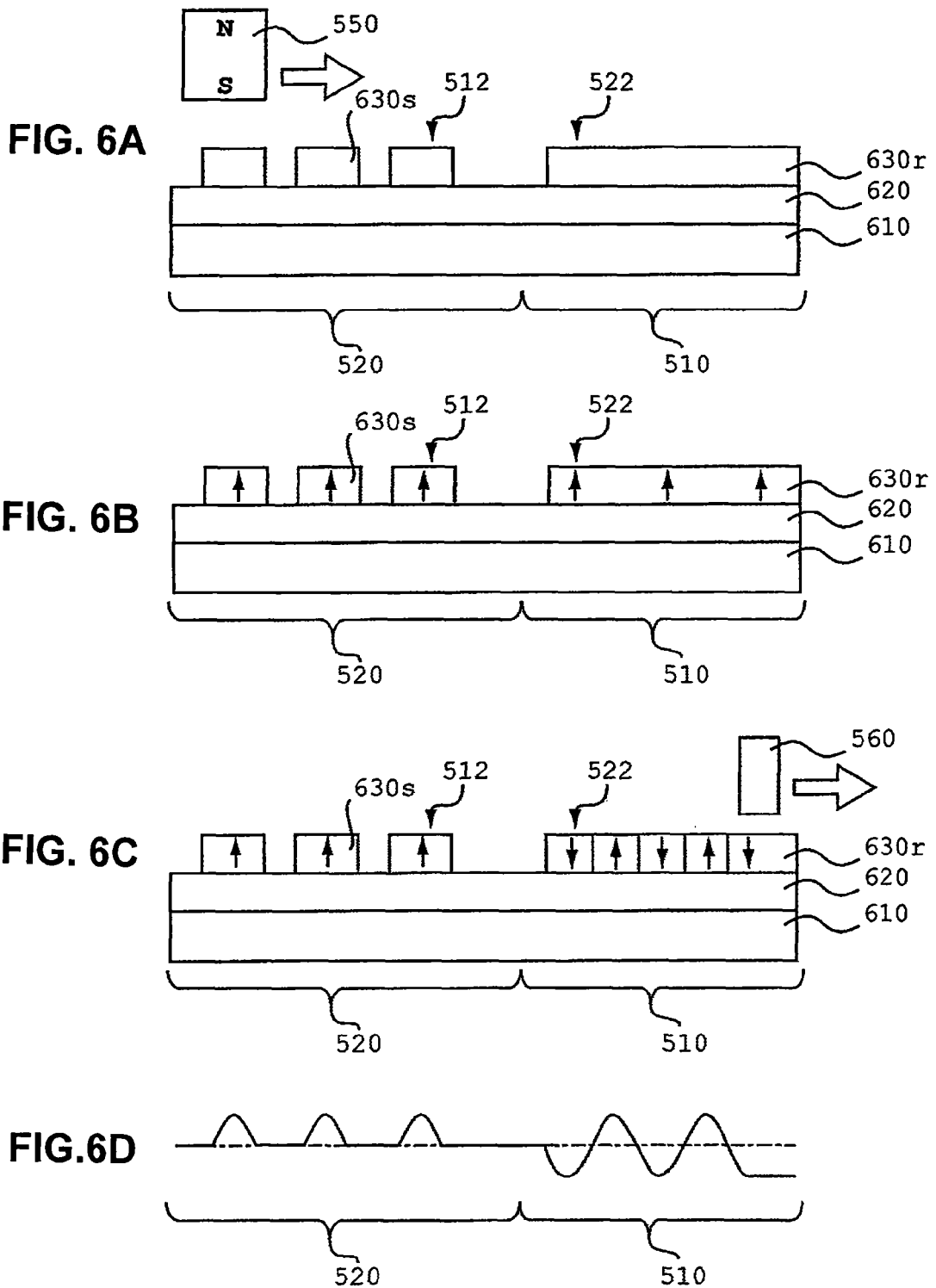

PERPENDICULAR RECORDING DISCRETE TRACK MEDIUM AND SERVO PATTERN MAGNETIZATION METHOD FOR SAME

CROSS REFERENCE TO RELATED APPLICATIONS

This application claims priority from Japanese Patent Application Serial No. 2007-002453, filed on Jan. 10, 2007, the contents of which are incorporated herein in their entirety by reference.

BACKGROUND OF THE INVENTION

A. Field of the Invention

This invention relates to a perpendicular recording discrete track medium, and to a servo pattern magnetization method for such medium.

B. Description of the Related Art

Since 1997, HDD (hard disk drive) recording densities have risen rapidly at an annual pace of between 60 and 100%. As a result of such remarkable growth, the in-plane recording methods which have been used in the past are approaching recording density limits. In light of this situation, much attention is focused on a the perpendicular recording method which enables still higher densities, and much research and development has been conducted. And, from 2005, HDDs adopting perpendicular recording have begun to be commercialized in some products.

A perpendicular magnetic recording medium mainly comprises a magnetic recording layer of a hard magnetic material; an underlayer, to orient the magnetic recording layer in a target direction; a protective film, which protects the surface of the magnetic recording layer; and a soft magnetic layer, which serves to concentrate magnetic flux generated by a magnetic head used in recording to the magnetic recording layer.

Research and development of discrete track media, in which a plurality of recording tracks are magnetically separated, is being performed with the aim of further increasing the recording densities of perpendicular magnetic recording media. In FIG. 5A, a schematic top view of a discrete track medium of the prior art is shown. The discrete track medium 500 is divided, in the circumferential direction on the disc-shaped substrate, into a plurality of sectors 530, each comprising recording areas 510 having a plurality of recording tracks for recording data and servo areas 520 having servo patterns for detection of the width-direction position of each track. In FIG. 5B, area 540 in a portion of sector 530 of the discrete track medium is shown enlarged and extended in a straight line, to show an example of the structure of recording areas 510 and servo areas 520. The plurality of recording tracks 512 in recording areas 510, as well as the plurality of servo blocks 522 holding position information for each track in servo areas 520, are formed as physical protrusions and depressions. Here, the plurality of tracks 512 and plurality of servo blocks 522 are formed by etching the magnetic recording layer using lithography techniques. The plurality of tracks 512 positioned at equal distances from the medium center together form concentric circular tracks 514. The plurality of tracks 512 are magnetically separated from adjacent tracks 512 by physical protrusions and depressions existing between the tracks and adjacent tracks 512, so that magnetic interference therebetween is mitigated.

An example of a servo pattern magnetization method for a discrete track medium of the prior art appears in FIG. 6. A discrete track medium generally has a structure comprising, at least, nonmagnetic substrate 610, soft magnetic layer 620, and magnetic recording layer 630 which is divided into a plurality of portions. In servo pattern magnetization, single-pole head 550 which imparts a magnetic field in the substrate perpendicular direction (here, an example is shown in which the S pole opposes the discrete track medium) is positioned in proximity to magnetic recording layer 630 of the discrete track medium, and is moved in the circumferential direction (track direction), as shown in FIG. 6A. The magnetization obtained by this process appears in FIG. 6B. A magnetization in a direction perpendicular to the substrate (here, upward) is imparted to both magnetic recording layers 630s (servo blocks 522) and 630r (tracks 512).

The process of information recording onto a discrete track medium is performed, as shown in FIG. 6C, by using the single-pole head 560 to impart a perpendicular-direction magnetization corresponding to the information (in both the upward and downward directions) to magnetic recording layer 630r (tracks 512). Signals obtained when a read head is used to read the magnetization of magnetic recording layer 630 appear in FIG. 6D. As is clearly shown in FIG. 6D, whereas data signals from recording areas 510 have full amplitude, servo signals from servo areas 520 have half amplitude.

When servo signals have half amplitude, the signal strength is half as great or less. As a result, the precision of head positioning is degraded, and higher track recording densities are difficult to achieve. And, because data signals have full amplitude, signal intensity modification and/or waveform shaping may be necessary when servo signals are read or when data signals are read.

In response to this problem, a method has been proposed in which servo patterns (position detection marks) arranged within servo zones comprise magnetic recording block areas capable of recording a plurality of bits, and full-amplitude servo signals (magnetization inversion signals) are recorded in the magnetic recording block areas (Japanese Patent Laid-open No. 2004-110896). In addition, a method has been proposed in which a perpendicular magnetic recording layer having two types of areas, with different coercivity, is used in servo signal areas (Japanese Patent Laid-open No. 2003-016623). In this method, initially a perpendicular magnetic field of sufficient intensity is applied, and the two types of areas are magnetized in a single direction. Then, a perpendicular magnetic field, of intensity sufficient in the opposite direction to invert the magnetization of only one among the two types of area, is applied, so that the magnetization is inverted in only one of the two types of areas, and servo signal areas are formed in which full-amplitude servo signals are recorded.

The present invention is directed to overcoming or at least reducing the effects of one or more of the problems set forth above.

SUMMARY OF THE INVENTION

An object of this invention is to provide a magnetization method for servo patterns, comprising full-amplitude servo signals, using more simple processes.

A perpendicular recording discrete track medium of this invention comprises a recording area having a plurality of recording tracks, and a servo area having a servo pattern for detection of the width-direction position of each track, and is characterized in that each of the plurality of tracks comprises a soft magnetic layer formed on the substrate separated from other tracks, and a magnetic recording layer formed on the soft magnetic layer separated from other tracks and having an easy axis of magnetization in a direction perpendicular to the substrate surface. The servo area has a plurality of servo blocks patterned into a servo pattern for detection of the width-direction position of each track, and the plurality of servo blocks have a soft magnetic layer, formed on the substrate, separated from other servo blocks, and a magnetic recording layer, formed on the soft magnetic layer, separated from other servo blocks and having an easy axis of magnetization in a direction perpendicular to the substrate surface. Each of the plurality of servo blocks has magnetization in the direction perpendicular to the substrate, and in opposite directions.

A servo pattern magnetization method of this invention is a method for magnetizing the servo pattern of a perpendicular recording discrete track medium of this invention, and comprises a process by which magnetization is recorded, perpendicular to the substrate and in opposite directions, in the magnetic recording layer of each of a plurality of servo blocks, by means of the leakage magnetic field from the soft magnetic layer when a magnetic field is applied. Here, the applied magnetic field may be a uniform magnetic field in the direction of track extension.

By means of the above configuration, a perpendicular recording discrete track medium of this invention has servo signals in the form of magnetization which is perpendicular to the substrate and in opposite directions, that is, which have full amplitude, so that when reading servo signals the need for intensity modification or for waveform shaping can be eliminated. By means of this advantageous result, the perpendicular recording discrete track medium of this invention affords such further advantages as improved head positioning precision, and higher track recording densities. Moreover, servo pattern magnetization, i.e., recording of full-amplitude servo signals, can be performed efficiently using a single process in which a uniform magnetic field is applied in the circumferential direction.

BRIEF DESCRIPTION OF THE DRAWINGS

The foregoing advantages and features of the invention will become apparent upon reference to the following detailed description and the accompanying drawings, of which:

FIG. 1 shows an aspect of a perpendicular recording discrete track medium of this invention, in which

FIG. 2 is cross-sectional views of the perpendicular recording discrete track medium of the aspect shown in FIG. 1, in which

FIG. 3 shows a servo pattern magnetization method process for the perpendicular recording discrete track medium of the aspect shown in FIG. 1, in which

FIG. 4 shows a read/write pattern for the perpendicular recording discrete track medium of the aspect shown in FIG. 1, in which

FIG. 5 shows the perpendicular recording discrete track medium of the prior art, in which FIG. 5B is an enlarged view showing recording areas and servo areas; and, FIG. 6 shows a servo pattern magnetization method process for the perpendicular recording discrete track medium of the prior art, in which FIG. 6A shows the magnetization process, and FIG. 6B shows the servo pattern obtained.

DETAILED DESCRIPTION OF SPECIFIC EMBODIMENTS

Figure 1A:
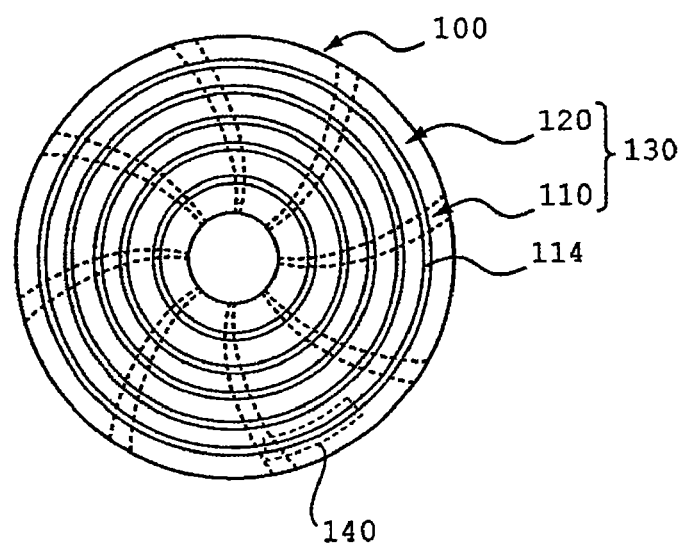
FIG. 1A is a top view.
Figure 1B:
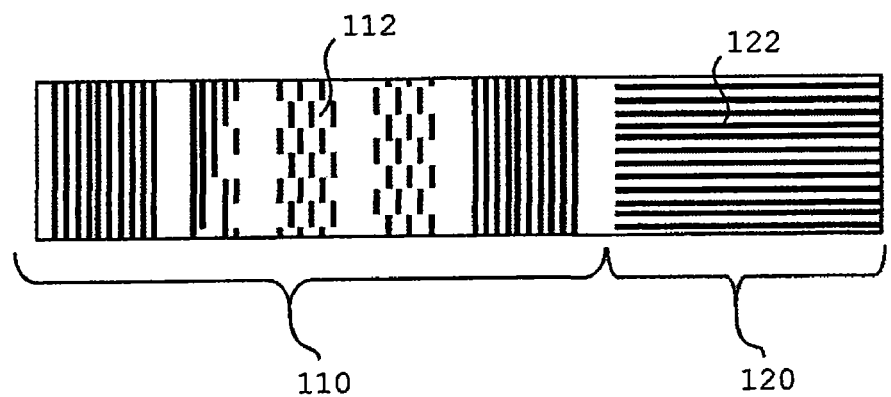
FIG. 1B is an enlarged view showing recording areas and servo areas.
Figure 2A:
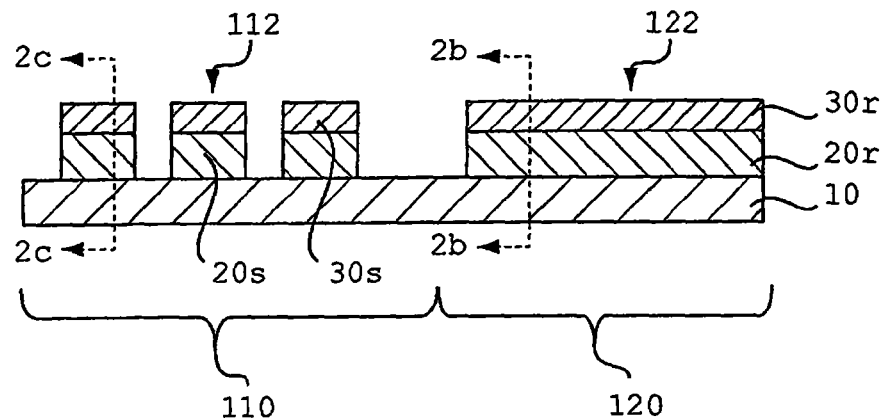
FIG. 2A is a cross-sectional view along the circumference.
Figure 2B:
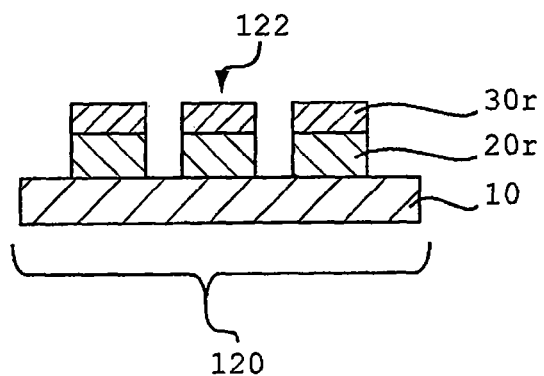
FIG. 2B is a cross-sectional view along cutting line 2b-2b.
Figure 2C:
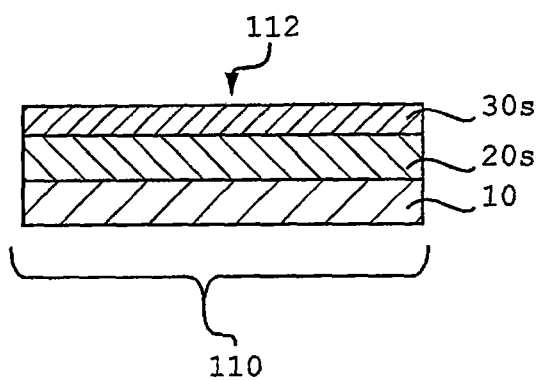
FIG. 2C is a cross-sectional view along cutting line 2c-2c.

In FIG. 1A, a schematic top view of a perpendicular recording discrete track medium of the invention is shown. The perpendicular recording discrete track medium 100 of this aspect of the invention has formed, divided in the circumferential direction on a disc-shape substrate, a plurality of sectors 130, comprising recording areas 120 having a plurality of recording tracks and servo areas 110 having servo patterns for detection of the width-direction positions of each track. In FIG. 1B, the area 140 of a portion of a sector 130 is shown enlarged, showing an example of the structure of a recording area 120 and servo area 110, extended in a straight line. A cross-sectional structure of the perpendicular recording discrete track medium of this invention is shown in FIG. 2. In FIG. 2A, a cross-sectional view along a circumference at a position equivalent to one track is shown; FIG. 2B is a cross-sectional view along cutting line 2b-2b; and FIG. 2C is a cross-sectional view along cutting line 2c-2c.

Each of the plurality of recording areas 120 of the perpendicular recording discrete track medium of this invention comprises a plurality of tracks 122. The plurality of tracks 122 positioned at equal distances from the medium center together form concentric circular tracks 114. The plurality of tracks 122 each comprise soft magnetic layer 20r formed independently from other tracks on substrate 10, and magnetic recording layer 30r formed independently of other tracks. That is, soft magnetic layer 20r and magnetic recording layer 30r comprised by one track 122 are formed separately from the magnetic recording layers of adjacent tracks 122 in the same recording area, and tracks 122 forming the same track within adjacent recording areas are separated by servo areas 110.

Each of the plurality of servo areas 110 of the perpendicular recording discrete track medium of this invention comprises a plurality of servo blocks 112. The plurality of servo blocks 112 are arranged in a pattern which enables detection of the position of the track 122 of the recording area and of the track 114 comprising tracks 122. Each of the plurality of servo blocks 112 comprises a soft magnetic layer 20s, formed independently of other servo blocks on the substrate 10, and a magnetic recording layer 30s, formed independently of other servo blocks. That is, the soft magnetic layers 20s and magnetic recording layers 30s comprised by the plurality of servo blocks 112 are formed separately from adjacent servo blocks 112 in the same servo area, and are also formed separately from tracks in the recording areas. Each of the plurality of servo blocks 112 has magnetization which is perpendicular to the substrate, and in opposite directions.

Substrate 10 is nonmagnetic and has a flat surface. Substrate 10 can be fabricated using any known material, using techniques of the prior art. For example, a NiP-plated Al alloy, or reinforced glass or crystallized glass, can be used to fabricate substrate 10 for use in a magnetic recording medium.

Soft magnetic layers 20(r,s) can be formed using crystalline materials such as FeTaC, Sendust (FeSiAl) alloy, or the like; microcrystalline materials such as FeTaC, CoFeNi, CoNiP, and the like; and amorphous materials comprising Co alloys such as CoZrNb, CoTaZr, and the like. The optimum value for the film thickness of soft magnetic layers 20(r,s) differs depending on the structure and characteristics of the magnetic head used in recording, but in consideration of a balance with manufacturing properties, a thickness of approximately 10 nm or greater and 500 nm or less is desirable. A nonmagnetic underlayer, formed from a nonmagnetic material such as Ti or a TiCr alloy or other material containing Cr, may be provided between soft magnetic layers $20(r,s)$ and the substrate.

Magnetic recording layers $30(r,s)$ can be suitably fabricated using ferromagnetic alloy material comprising at least Co and Pt. In order to obtain a discrete track medium to be used for perpendicular magnetic recording, it is necessary that the easy magnetization axis (c axis of a hexagonal close-packed (hcp) structure) of the material of the magnetic recording layers $30(r,s)$ be oriented in the direction perpendicular to the surface of substrate 10. Magnetic recording layers $30(r,s)$ can, for example, be formed using alloy materials such as CoPt, CoCrPt, CoCrPtB, CoCrPtTa, and the like. No limitations in particular are placed on the thickness of magnetic recording layers $30(r,s)$. However, from the standpoint of manufacturing properties and improvement of recording density, it is preferable that magnetic recording layers $30(r,s)$ be of thickness 30 nm or less, and still more preferable that the thickness be 15 nm or less.

Further, as an option, a seed layer may be provided between the soft magnetic layers 20 and the magnetic recording layers $30(r,s)$, to enhance the crystal orientation of the magnetic recording layer material. The seed layer can be formed from a Permalloy-system material, such as NiFeAl, NiFeSi, NiFeNb, NiFeB, NiFeNbB, NiFeMo, NiFeCr, or similar; from a Permalloy-system material such as CoNiFe, CoNiFeSi, CoNiFeB, CoNiFeNb, and similar, with Co further added; from Co; or from a Co-base alloy such as CoB, CoSi, CoNi, CoFe, or the like. It is desirable that the seed layer have a film thickness adequate to control the crystal structure of the magnetic recording layers $30(r,s)$; normally, a film thickness of 3 nm or greater and 50 nm or less is desirable.

Formation of soft magnetic layers 20, magnetic recording layers $30(r,s)$, and the optional nonmagnetic underlayer and seed layer can be performed using a sputtering method (DC magnetron sputtering, RF magnetron sputtering, or similar), vacuum deposition, or another method known in the prior art.

Patterning to form the plurality of tracks 122 and servo blocks 112 can be performed using photolithography techniques. For example, resist may be used to form a mask having a desired pattern, and wet etching, sputter etching, plasma etching, reactive ion etching, or other well-known means of the prior art may be used to etch soft magnetic layers 20, magnetic recording layers $30(r,s)$, and optional nonmagnetic underlayer and seed layer. After etching is completed, cleaning with a solvent, plasma ashing, or another method can be used to remove the mask, to obtain the plurality of tracks 122 and servo blocks 112.

A protective layer and/or liquid lubricating layer may optionally be provided on magnetic recording layers $30(r,s)$. The protective layer is a layer to protect magnetic recording layers $30(r,s)$ and each of the layers underneath. For example, a thin film the main component of which is carbon can be used. In addition, a protective layer can be formed using various thin film materials known as materials for the protective films of a magnetic recording medium in the prior art. A protective layer can be formed using general sputtering methods (DC magnetron sputtering, RF magnetron sputtering, and similar), vacuum deposition, CVD, or other methods. A liquid lubricating layer is a layer provided to impart lubrication when a read/write head makes contact with the perpendicular recording discrete track medium. For example, perfluoropolyether liquid lubricants, or various other liquid lubricant materials known in the prior art can be used. The liquid lubricant layer can be formed using a dip-coating method, spin-coating method, or other well-known application methods in the prior art.

Figure 3A:
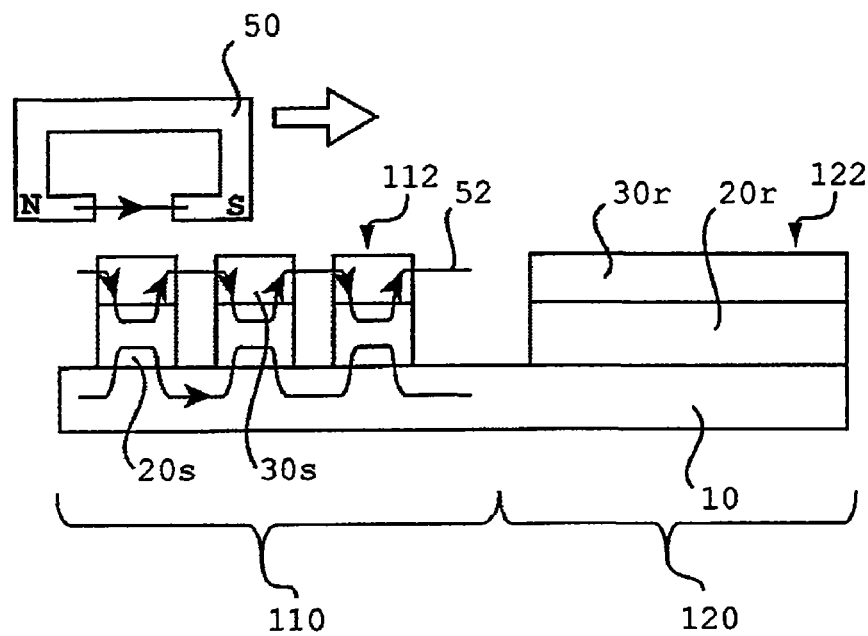
FIG. 3A shows the magnetization process.
Figure 3B:
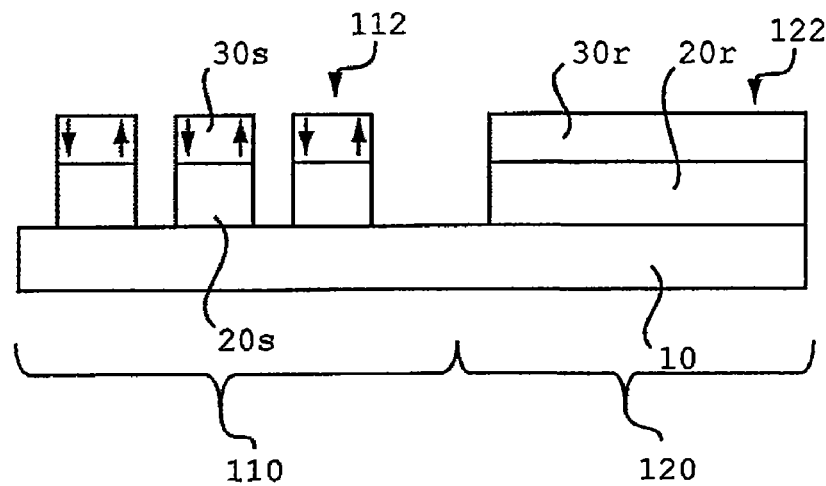
FIG. 3B shows the servo pattern obtained.

Next, a servo pattern magnetization method, to magnetize a plurality of servo blocks 112 of the perpendicular recording discrete track medium of this invention, is explained. Initially, as shown in FIG. 3A, ring magnet 50 which generates a magnetic field in the medium circumferential direction (that is, in the direction of track extension) is positioned immediately above and close to the perpendicular recording discrete track medium, and ring magnet 50 is moved relative to the medium. Here, ring medium 50 may be held stationary while the medium is rotated, or the medium may be held stationary and ring magnet 50 moved in the circumferential direction. Because soft magnetic layers $20s$ are discontinuous in servo areas 110, in the portions in which soft magnetic layers $20s$ exist, magnetic flux 52 generated by ring magnet 50 is concentrated in soft magnetic layers 20 having a high permeability. At this time, a leakage magnetic field having a perpendicular component is generated at both edges of soft magnetic layers $20s$, due to the concentration of magnetic flux. In FIG. 3A, because a rightward-directed magnetic field is generated by ring magnet 50, a downward leakage magnetic field is generated near the left-hand edge, and an upward leakage magnetic field is generated near the right-hand edge, of servo block 112 (magnetic recording layer $30s$). By means of this leakage magnetic field, as shown in FIG. 3B, each of the plurality of magnetic recording layers $30s$ is magnetized, with downward magnetization recorded near the left-hand edge and upward magnetization recorded near the right-hand edge as the servo pattern.

Figure 4A:
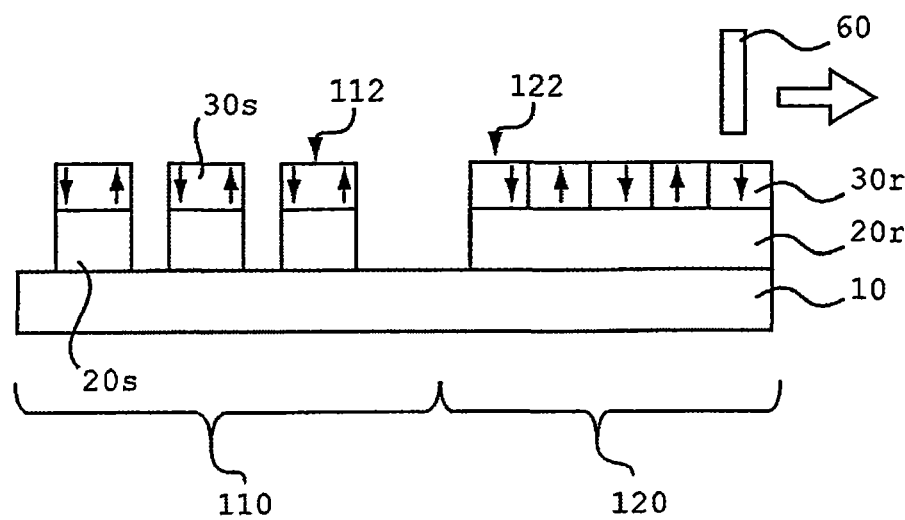
FIG. 4A shows writing.
Figure 4B:
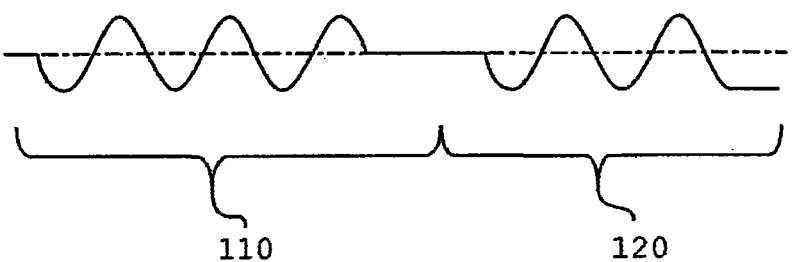
FIG. 4B shows reading.
Figure 5A:
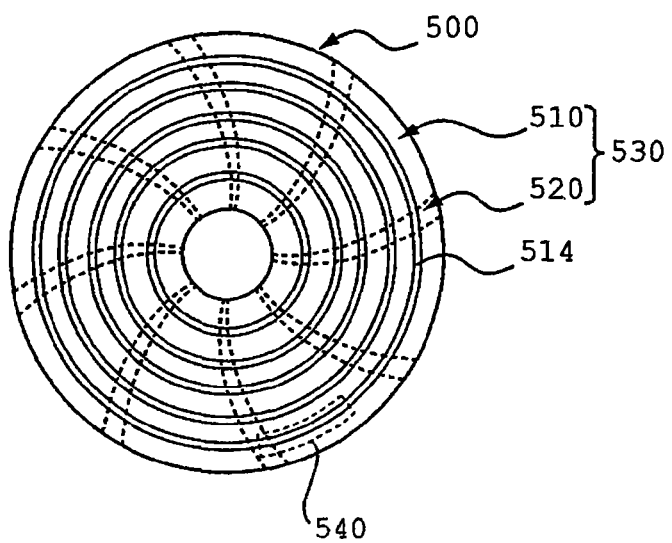
FIG. 5A is a top view.
Figure 5B:
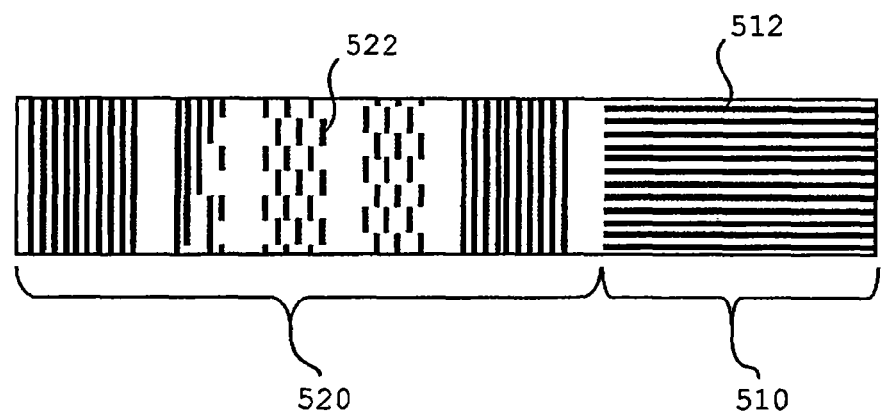

FIG. 4 is used to explain writing to and reading from the perpendicular recording discrete track medium onto which servo patterns have been recorded as described above. As shown in FIG. 4A, single-pole head 60 is used to record magnetization, upward and downward, in magnetic recording layers $30r$ of tracks 122 within recording areas 120 according to the information to be recorded. Signals from servo areas 110 and recording areas 120, read using a read head (a GMR head or similar, not shown), appear in FIG. 4B. As is clear from FIG. 4B, magnetization is recorded in both directions (upward and downward) in both servo areas 110 and in recording areas 120, so that full-amplitude servo signals are obtained from servo areas 110, and full-amplitude data signals are obtained from recording areas 120. Because full-amplitude signals are obtained from both areas, during servo signal reading and data signal reading, the need for intensity modification and waveform shaping can be eliminated. Hence by using the perpendicular recording discrete track medium of this invention, the precision of head positioning can be improved, and track recording densities can be raised.

Thus, a servo pattern magnetization method has been described according to the present invention. Many modifications and variations may be made to the techniques and structures described and illustrated herein without departing from the spirit and scope of the invention. Accordingly, it should be understood that the devices and methods described herein are illustrative only and are not limiting upon the scope of the invention.

What is claimed is:
1. A perpendicular recording discrete track medium, comprising:
   a recording area having a plurality of recording tracks; and
   a servo area having servo patterns for detecting width-direction positions of each of the tracks,
   wherein each of the plurality of tracks comprises a soft magnetic layer formed on a substrate, wherein each of the plurality of tracks is separated from each adjacent track, and a magnetic recording layer formed on the soft magnetic layer separated from other tracks and having an easy axis of magnetization in a direction perpendicular to the substrate surface;

the servo area has a plurality of servo blocks patterned into a servo pattern for detection of the width-direction position of each track, and the plurality of servo blocks have a soft magnetic layer, formed on the substrate, wherein each of the plurality of servo blocks is separated from each adjacent servo block, and a magnetic recording layer, formed on the soft magnetic layer, separated from other servo blocks and having an easy axis of magnetization in a direction perpendicular to the substrate surface; and each of the plurality of servo blocks has magnetization in the direction perpendicular to the substrate and in opposite directions, wherein each of the plurality of servo blocks has downward magnetization recorded near one of its edges and upward magnetization recorded near its other edge.

2. A servo pattern magnetization method, for a perpendicular recording discrete track medium having a recording area having a plurality of recording tracks and a servo area having servo patterns for detecting width-direction positions of each of the tracks, each of the plurality of tracks comprising a soft magnetic layer, formed on the substrate, wherein each of the plurality of tracks is separated from each adjacent track, and a magnetic recording layer, formed on the soft magnetic layer, separated from other tracks and having an easy axis of magnetization in a direction perpendicular to the substrate surface;

the servo area having a plurality of servo blocks comprising a servo pattern for detection of the width-direction positions of each track, and each of the plurality of servo blocks comprising a soft magnetic layer, formed on the substrate, wherein each of the plurality of servo blocks is separated from each adjacent servo block, and a magnetic recording layer, formed on the soft magnetic layer, separated from other servo blocks and having an easy axis of magnetization in a direction perpendicular to the substrate surface; and the method comprising applying a magnetic field to record a magnetization by using a leakage magnetic field from the soft magnetic layer, to induce magnetization in the magnetic recording layers of each of the plurality of servo blocks magnetization, the magnetization being in a direction perpendicular to the substrate and being in opposite directions in different regions of the same servo block.

3. The servo pattern magnetization method according to claim 2, wherein the applied magnetic field is a uniform magnetic field in a direction of extension of the track.

4. A servo pattern magnetization method according to claim 2, wherein each of the plurality of servo blocks has downward magnetization recorded in a region near one of its edges and upward magnetization recorded in a region near its other edge.

5. A servo pattern magnetization method according to claim 2, comprising using a ring magnet to produce the applied magnetic field.

* * * * *